United States Patent [19]

Herchenbach et al.

[11] 4,288,213
[45] Sep. 8, 1981

[54] METHOD AND APPARATUS FOR THE HEAT TREATMENT OF FINE-GRAINED MATERIAL

[75] Inventors: Horst Herchenbach, Troisdorf; Hubert Ramesohl, Bergisch-Gladbach; Joachim Fleischer, Lohmar, all of Fed. Rep. of Germany

[73] Assignee: Klöckner-Humboldt-Deutz AG, Fed. Rep. of Germany

[21] Appl. No.: 84,582

[22] Filed: Oct. 15, 1979

[30] Foreign Application Priority Data

Oct. 26, 1978 [DE] Fed. Rep. of Germany ....... 2846584

[51] Int. Cl.³ .......................... F27B 15/00; C04B 7/02
[52] U.S. Cl. ..................................... 432/14; 106/100; 432/106
[58] Field of Search ............................. 432/14, 15, 16; 106/100

[56] References Cited

U.S. PATENT DOCUMENTS

| | | | |
|---|---|---|---|
| 2,670,193 | 2/1954 | Pyzel | 432/15 |
| 2,874,950 | 2/1959 | Pyzel | 432/15 X |
| 2,981,531 | 4/1961 | Pyzel | 432/15 X |
| 3,498,594 | 3/1970 | Rikhof | 106/100 |
| 3,932,117 | 1/1976 | Ritzmann | 432/14 |
| 4,118,177 | 10/1978 | Weber et al. | 432/14 |
| 4,174,946 | 11/1979 | Rohde | 432/14 |

Primary Examiner—John J. Camby
Attorney, Agent, or Firm—Hill, Van Santen, Steadman, Chiara & Simpson

[57] ABSTRACT

Method and apparatus for the heat treatment of fine-grained material, particularly raw material for the manufacture of cement wherein the material is pre-heated, calcined, sintered, and then cooled, the sintering of the substantially calcined material according to the present invention being carried out in the form of an airborne suspension.

15 Claims, 6 Drawing Figures

METHOD AND APPARATUS FOR THE HEAT TREATMENT OF FINE-GRAINED MATERIAL

BACKGROUND OF THE INVENTION

1. Field of the Invention

This invention is in the field of heat treatment of finely divided materials of the type used for the manufacture of cement which involves the combination of pre-heating, calcining, sintering, and cooling and is specifically directed to improving the sintering operation by carrying it out in a suspension type reaction zone.

2. Description of the Prior Art

In the dry process of manufacturing cement, the cement raw material which ranges in particle size from fine-grained materials to powder is delivered to a material pre-heater through which it passes in counter-current and/or parallel flow to hot treatment gases which are generated in a rotary kiln in which the material is sintered at high temperatures. A cement clinker is formed by sintering in the kiln, and this clinker is cooled in a cooler connected to the rotary kiln for further processing. The material pre-heater represents a stationary system part which is not very susceptible to wear, but the rotary kiln has a series of moving rotary parts which are subject to high wear in the dusty and high temperature atmosphere. The connections of the rotary kiln to the stationary material pre-heater or to the stationary material cooler are particularly in need of intensive maintenance and monitoring.

Some attempts have been made to replace the rotary kiln as a calcining or sintering apparatus through the use of a pipe-shaped horizontally disposed chamber, as suggested in German AS No. 1,807,292. Pre-heated fine material, hot cooler exhaust gases, and gaseous fuel are blown into the chamber from an end face. Cold cooling air is blown in by means of a closed circular pipe line at the end of the horizontal, pipe-shaped combustion chamber. In the heat treatment of cement raw material, this combustion chamber is not particularly advantageous. For example, the combustion chamber can only be charged with gaseous fuels. In order to achieve uniform distribution of the material in the combustion chamber, high flow rates must be employed. In this way, the material is subjected to treatment times which are too short so that the sintering of the material is not always carried to completion. In order to avoid formation of incrustations in the combustion chamber, the cooling air must be blown into the combustion chamber from the end. The thermal efficiency of the entire system is correspondingly low. These disadvantages also apply to a stationary combustion device in which a cold twisting stream is maintained in order to avoid material incrustations in the combustion chamber as suggested by German OS No. 2,350,768.

Finally, a system for the heat treatment of fine-grained material in a combustion chamber utilizing solid or liquid fuels is described in German OS No. 2,629,082. These fuels, however, must first be gasified in a separate gasification device because the fuel must be gaseous when it is introduced into the combustion chamber. This very significantly increases the cost of the system, since appropriate control and process engineering devices are required. The system of this publication is also pretty much confined to fine-grained hydrated aluminas or other fine-grained ores.

SUMMARY OF THE INVENTION

The present invention provides a method and apparatus for multi-stage heat treatment, particularly of finely divided cement raw material, wherein the sintering of the material can be carried out in suspension independently of the type of fuel employed, and providing for precisely adjustable conditions and a high flow rate. The method is carried out in a system which contains essentially stationary units, can be compact in construction, with low radiation and heat losses and in which wear and maintenance problems are substantially minimized.

The present invention involves the heat treatment of materials having low melting phase components, particularly cement raw material, in which the sintering of the largely calcined material is carried out in a suspension reaction zone, preferably under conditions of parallel flow. It has been found that cement raw materials, preferably after a suitable deacidification in a hot gas suspension, can be sintered in the shortest time with respect to their low melting phase components. The suspension is not influenced by wide changes in operating conditions. The breakdown of the suspension due to agglomeration produced as a result of low melting phase formation can, in contrast to usual methods, be completely eliminated. The present invention provides a controlled sintering of a largely calcined material which occurs in suspension, to provide a high flow-through output. Furthermore, fuels of any type can be introduced into the suspension type sintering zone without it being necessary to gasify the fuels as previously.

BRIEF DESCRIPTION OF THE DRAWINGS

Further features and advantages of the invention are described in the accompanying drawings in which.

DESCRIPTION OF THE PREFERRED EMBODIMENTS

Figure 1:
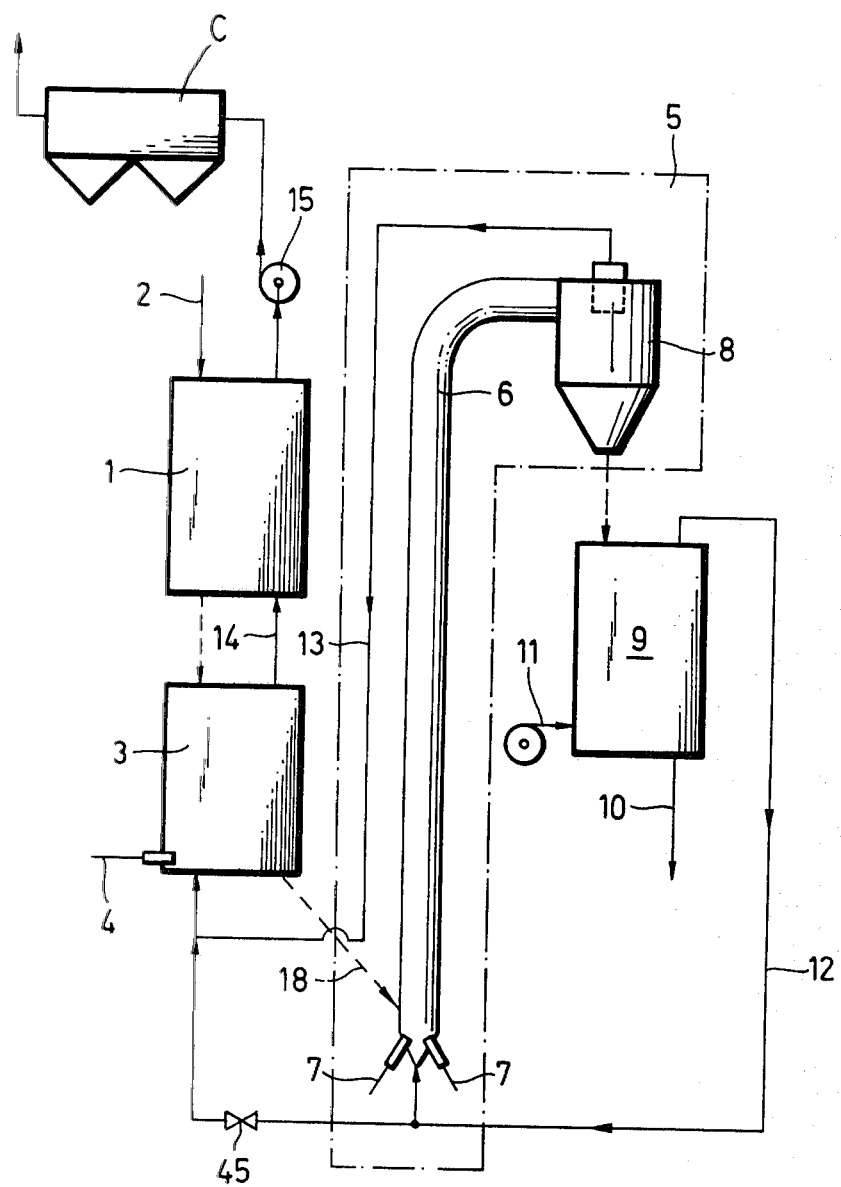
FIG. 1 illustrates rather schematically an improved heat treatment system which can be used in accordance with the present invention.

In a preferred form of the invention, there is provided a separate separation zone between the suspension type sintering zone and the cooling zone in which material is separated from the hot gases. When this is done, the hot gases from the sintering zone can be reintroduced into the heat treatment system and can be employed for calcining or preheating of the material so that its heat content is optimally employed. It is also expedient to have the material emerging from the suspension type sintering zone be cooled in a cooling zone which is likewise in the form an airborne suspension or in a fluidized bed. A very rapid and efficient cooling of the sintered fine material is thus provided. This cooled fine material can then be directly supplied to the finished product storage without intermediate grinding, which leads to a significant reduction of system investment. It is also expedient to reintroduce a part of the clinker material separated in the separation zone into the reaction zone of the sintering reactor for the formation of initial nuclei.

In a further preferred form of the invention, the fuel required for heat treatment of the material is divided between the calcining zone and the suspension type sintering zone so that lower quality fuel (lower caloric content) is delivered into the calcining zone and higher quality fuel (higher caloric content) is delivered into the suspension type sintering zone. This is advantageous particularly when one must employ lower grade fuels as a result of the increasing scarcity of higher grade fuels. Thus, for example, the calcining of the fine-grained material can be carried out using oil shale or waste fuels. Consequently, the method of the present invention is geared to the most favorable economic conditions independently of whether the fuel employed is gaseous, fluid or solid.

In a further development of the method of the present invention, the oxidation agent required for fuel combustion is derived from the cooling zone and is introduced into the calcining zone or into the suspension sintering zone or both in relation to the distribution of fuel between those zones, so that the distribution of fuel between higher and lower grade fuels can be taken into consideration in an advantageous manner. It is accordingly expedient that the hot air taken from the cooling zone is divided according to the gas velocity required in the suspension sintering zone so that a stable suspension of material in the hot gases of the sintering can be retained depending upon the particle size of the fine material.

In a preferred embodiment of the invention, a part of the material separated in the separating zone is reintroduced into the suspension sintering zone so at least a part of the material is repeatedly exposed to the hot gases in the sintering zone and consequently a long dwell time of the material to be sintered is achieved in the suspension sintering zone.

In a particularly preferred embodiment of the method, at least one part of the largely calcined material is supplied from the calcining zone before introduction into the suspension sintering zone to a separate heat treatment for the volatilization of relatively low melting phases, particularly those containing alkali. Consequently, even a cement raw material which has low melting phase components can be sintered in suspension and the danger of material agglomeration is minimized. The low melting components of the material can be adjusted to values at which the suspension in the sintering zone can be monitored and can be maintained as a function of the preset gas velocities. It is advantageous that the material components constituting the low melting phase be less than 25% by weight and preferably 10% to 20% by weight of the material charged into the suspension sintering zone. The volatilized components of the raw material which are stripped by means of the heat treatment are cooled immediately thereafter and can be discarded as a separated dust.

In a further preferred embodiment of the invention, the volatility of the materials forming the low melting phase can be improved by adding flux materials, particularly water vapor, to the separate heat treatment and/or the suspension sintering zone to volatilize the alkali containing materials to a very high degree to insure complete sintering in the suspension sintering zone. During this sintering, the remaining components forming the low melting phase can be volatilized out of the material so that a cement clinker results which has a very low alkali content.

The invention is also directed to a heat treatment apparatus for carrying out the method, consisting of a material pre-heater, a calciner preferably having a separate fuel supply, and a suspension type sintering reactor connected to the outlet of the calciner in the direction of material flow, which suspension type sintering reactor is preferably operated with parallel type flow and to which a material cooler is, in turn, connected at its discharge. This heat treatment apparatus consists exclusively of stationary parts which are structurally uncomplicated and are easy to manufacture. Moving rotary parts, which are subjected to extraordinary wear and require special maintenance such, for example, as rotary tubular kilns, are completely eliminated. The clinker mineral formation occurs in suspension, so that the clinker which is produced ranges from finely granulated materials to powder. Consequently, the expensive clinker grinding systems previously used can be eliminated or significantly reduced. The cooled clinker can be completely or partially supplied directly to finished product storage means.

In a preferred form of the present invention, both the material calciner as well as the suspension type sintering reactor are equipped with separate fuel supply lines so that the material can be calcined to a very substantial degree in the calciner, and only the sintering of the material need be carried out in the suspension type sintering reactor. By so doing, the suspension sintering reactor is freed of the thermal load required for calcining the material.

The material calciner and the sintering reactor may be connected to receive hot air from the material cooler so that hot exhaust gases from the cooler are supplied as an oxygen-rich combustion gas to the calciner or to the sintering reactor. Suitable control or throttling means may be included in the hot air connection between the material calciner and the reactor so as to control the amount of hot air supplied to the calciner to that amount which is appropriate for stoichiometric combustion of the fuels introduced therein. On the other hand, sufficient hot air is introduced into the suspension sintering reactor as required to maintain an airborne material suspension in the reactor and is required for the combustion of the fuel introduced therein.

Another feature of the present invention provides a bypass line at the exhaust side of the material separator for a portion of the hot gases separated from the material so that a portion of the compounds forming the low-melting phase and volatilized out of the suspended material can be removed from the system. In this way, no circulation of harmful substances occurs which could prevent the maintenance of a material suspension in the sintering reactor under certain conditions. It is advantageous that the bypass line carrying the hot gases may include a cooling device in the area of the material separator to which there is a dust separator attached so that the harmful substances volatilized in the hot gases can be quenched and converted into crystalline, dust-like substances which can be precipitated out of the gases with conventional dust separators.

In a special case, all of the exhaust gases from the sintering reactor can be drawn off and directly or indirectly cooled and freed from dust whereby the separated material exhibits a higher alkali content than the remaining sintered final product.

In a particularly advantageous form of the invention, a separate heat treatment kiln is provided for the material in front of the suspension sintering reactor and this heat treatment kiln is equipped with an additional fuel supply line. The harmful substances contained in the fine material can be monitored and volatilized to such a degree as required for preserving the fine material suspension in the sintering reaction. A fluidization kiln or a short rotary kiln are particularly suitable for use as a separate heat treatment kiln.

In a further form of the present invention, the material discharge line from the material calciner is connected by means of a branching element both to the separate heat treatment kiln as well as to the suspension sintering reactor. In this way, the dimensioning of the heat treatment kiln can be such that the limits of harmful substances introduced into the suspension reactor are not exceeded. It is preferred that the suspension sintering reactor be connected on its material side to the separate heat treatment kiln by means of a recirculation line so that the highest values of low melting phase components in the material to be sintered can be controlled to a predetermined value.

Turning now to the drawings, in FIG. 1 there is illustrated a pre-heater 1 to which the material to be treated is introduced at an inlet 2. In the direction of material flow-through, a material calciner 3 follows the pre-heater 1 and is provided with a separate fuel supply line 4. A stationary suspension type sintering reactor 5 follows the material calciner 3. The reactor consists of a vertically disposed combustion chamber 6 near the bottom of which there are fuel supply lines 7. The suspension type sintering reactor is connected by means of a material separator 8 to a material cooler 9 from which the finished material is drawn off at a discharge line 10. Cold cooling air is blown into the cooler 9 by means of a blower 11 and the air after heating in the cooler leaves the cooler 9 by means of a discharge line 12. This line is connected to the lower end of the suspension type sintering reactor 5 and to the lower end of the material calciner 3, by means of a throttling valve 45. On the gas side, the material separator 8 is also connected to the material calciner 3 by means of an exhaust gas line 13. The hot gas is withdrawn from the material calciner supplied to the suspension gas pre-heater 1 by means of a further gas line 14. By means of the pre-heater exhaust gas blower 15, the hot combustion gases from the suspension type sintering reactor are drawn through the material calciner 3 and the pre-heater 1 and are supplied to a dust collector C connected to the output of the blower 15.

Figure 2:
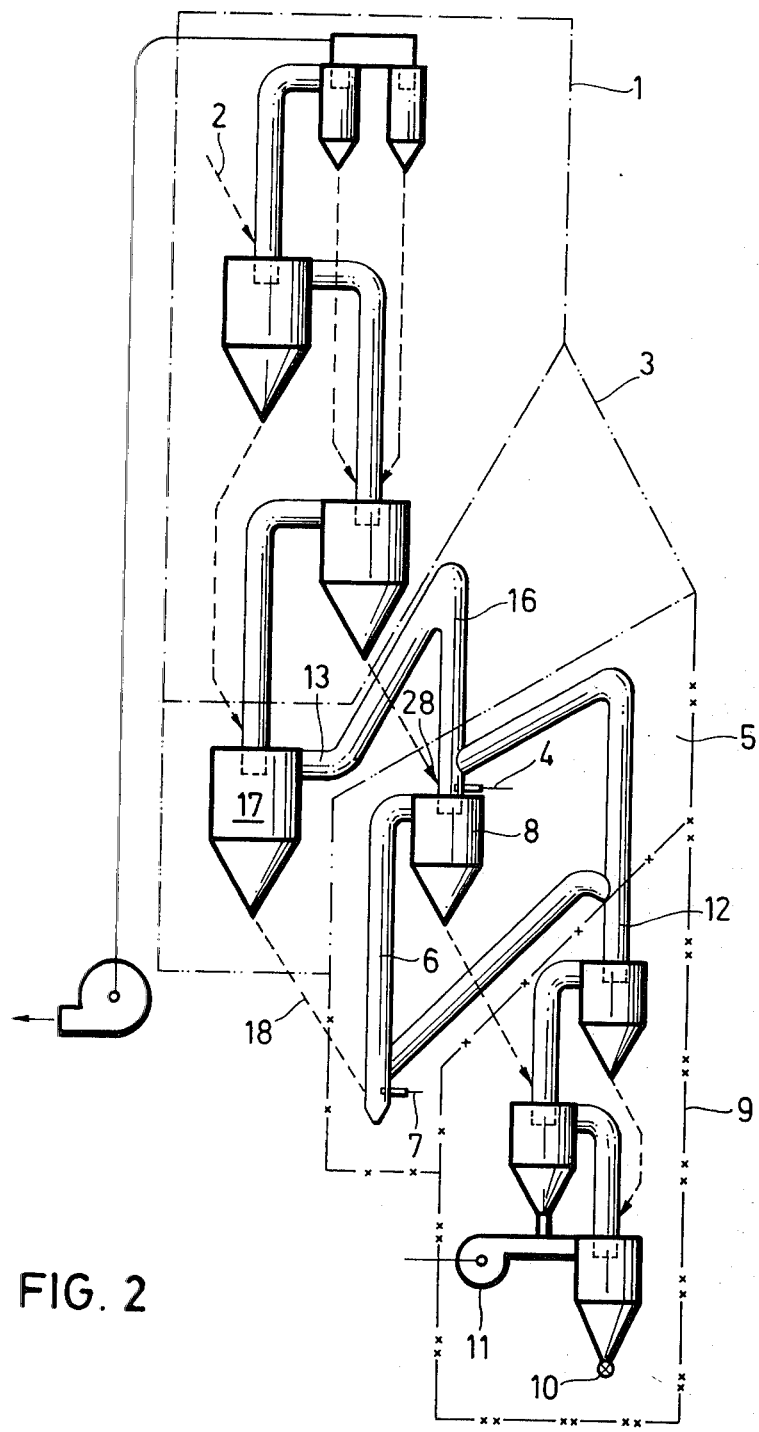
FIG. 2 illustrates a suspension type sintering reactor with a suspension type heat exchanger preceding it and a suspension type gas cooler following the same.

In FIG. 2 the pre-heater 1 is illustrated as a suspension gas pre-heater of the cyclone type embodying three heat exchanger cyclones arranged one above the other on the gas and material side, the uppermost cyclone being a double cyclone. The material calciner 3 consists of a combustion segment 16 into which the raw material which has been pre-heated in three stages is delivered at its lower end, with fuel being delivered by means of a fuel supply line 4. A material separating cyclone 17 forming part of the material calciner is situated directly after the combustion segment 16. The material separating cyclone 17 is connected to the lower end of the suspension type sintering reactor 5 by means of a material discharge line 18. The material separator 8 of the cyclone type forms part of the suspension sintering reactor 5 and is connected to the cyclone 17 of the calciner by means of the combustion segment 16 and the exhaust gas line 13. On the material discharge side, the material separator 8 is connected to a material cooler 9 also of the cyclone type. A blower 11 for supplying cooling air is connected to the lowermost cyclone of the material cooler and hot air is withdrawn from the uppermost cyclone of the cooler by means of a hot air line 12. This line is connected on the one hand to the combustion segment 16 of the material calciner 3 and also to the suspension type sintering reactor 5.

Figure 3:
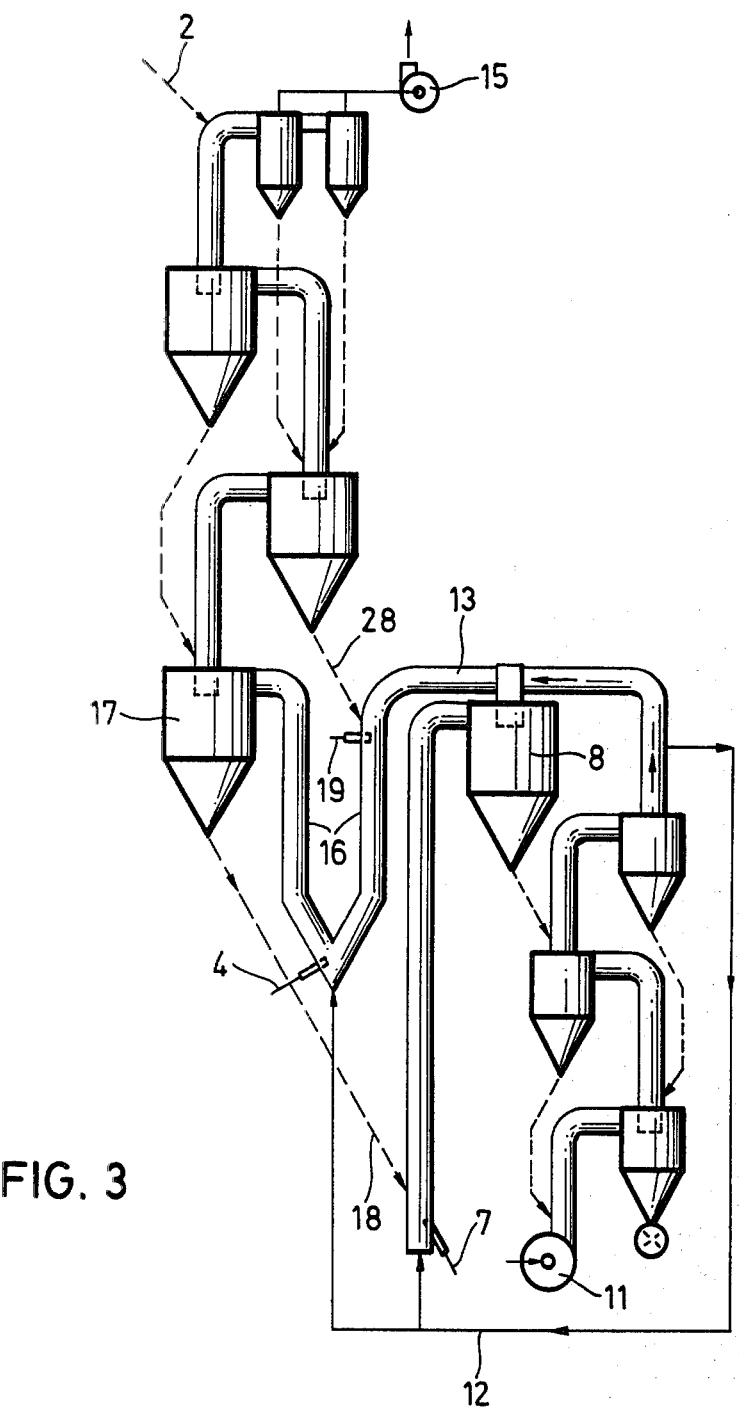
FIG. 3 represents a further embodiment of the heat treating system shown in FIG. 2.

In the variation shown in FIG. 3, the exhaust gas line 13 leading from the material separator 8 is first conducted perpendicularly down and then rises perpendicularly to the cyclone 17 of the calciner. The exhaust gas line includes a combustion segment 16 for the material calciner. In the area of discharge of this exhaust gas line from the material separating cyclone 8, the material heated in the three pre-heater stages is delivered from the pre-heater previously designated at reference numeral 1. A fuel supply line 19 is located in the leg in which the gases are moved downwardly. A further fuel supply line 4 is situated in an area where the hot air line 13 discharges into the combustion segment 16.

Figure 4:
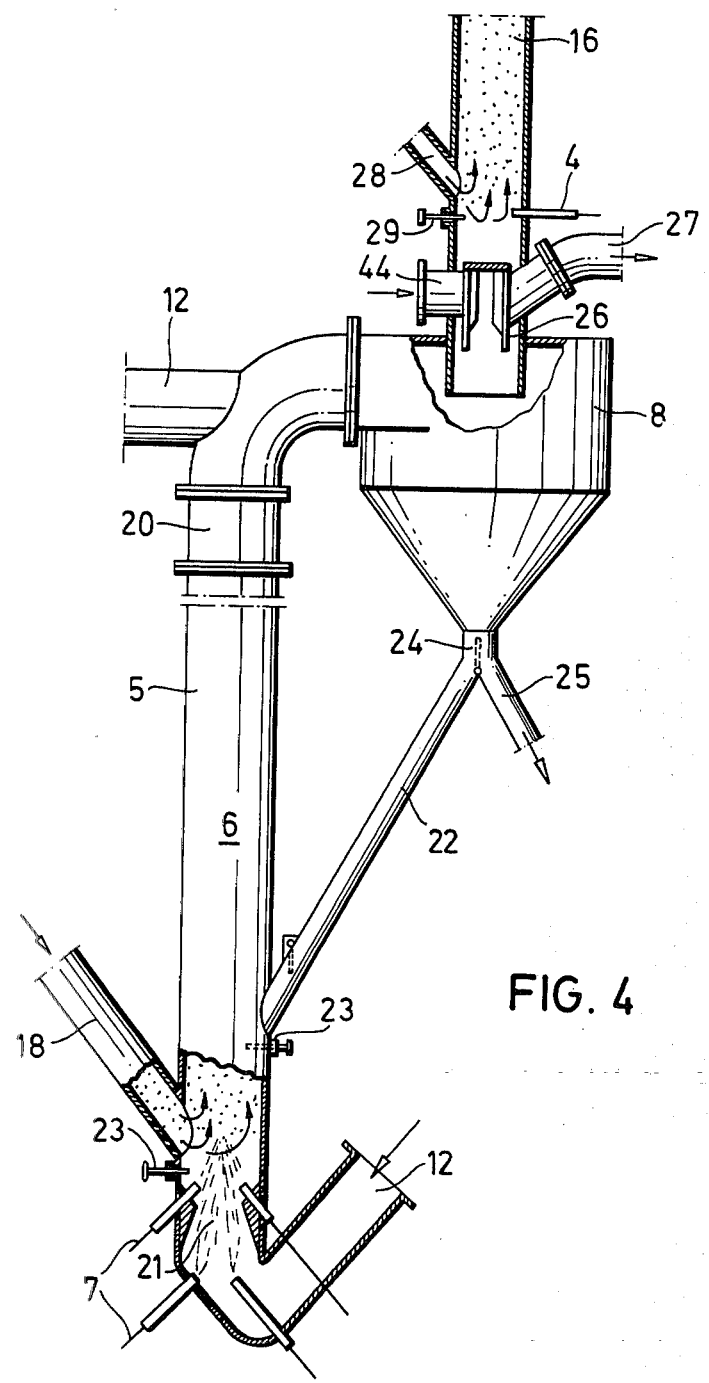
FIG. 4 is a fragmentary view of the suspension type sintering reactor with a separator cyclone and bypass line being illustrated in enlarged form.

The suspension sintering reactor 5 is illustrated in an enlarged form in FIG. 4. A vertically arranged combustion chamber 6 has a cross-sectional constriction 21 at its lower end. Fuel supply lines 7 are arranged above and below this cross-sectional constriction. The combustion chamber is connected to the air line 12 from the material cooler in this area. At the constriction 21, the feed pressure of the blower 11 and the induced draft from blower 15 as shown in FIG. 3 are approximately balanced. The material discharge line 18 of cyclone 17 in the calciner 3 discharges above the cross-sectional constriction 21. The upper end of the combustion chamber 6 includes engageable elements 20 so that the length of the combustion chamber can be altered. By means of this feature, there can be an optimum adaptation of the reactor to the necessary reaction time of the exothermal processing of the clinker mineral formation. The material separator cyclone 8 has a recirculation line 22 on its discharge side leading back into the combustion chamber of the suspension sintering reactor 5. One or more baffle slides 23 which are preferably adjustable are arranged above the discharge of the material discharge line 18 and below the discharge of the recirculation line 22 leading into the combustion chamber 6. A discharge line 25 from the material separator 8 having a baffle element 24 or the like is connected to the material cooler 9. A dip pipe 26 discharges on the gas side from the material separator 8 and serves to draw off hot combustion gases from the sintering reactor. A bypass line 27 is provided in the area of the dip pipe 26 and is cooled with cold air. The bypass line 27 is connected to a dust-removing device (not shown). The combustion segment 16 of the material calciner commences after the dip pipe 26. The material line 28 for the cement raw material which has been pre-heated in the pre-heater 1 is conducted into this combustion segment 16. An adjustable baffle slide 29 is positioned below the material introduction approximately at the same level as the fuel supply line 4. The hot air line 12 is conducted into the combustion chamber 6 of the suspension sintering reactor at a point where the clinker formation is already terminated.

Figure 5:
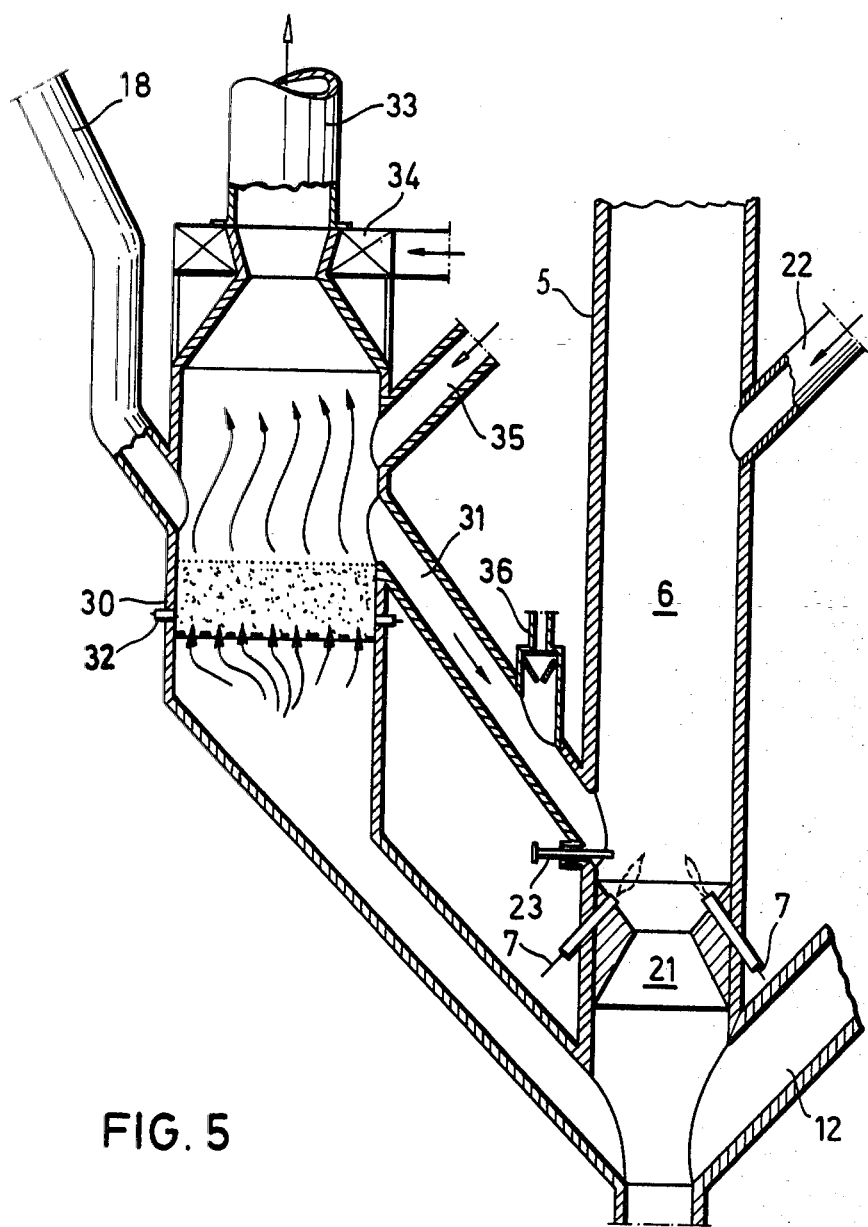
FIG. 5 illustrates a suspension type sintering reactor with an input fluidization reactor.

In FIG. 5 there is illustrated a fluidization reactor 30 for the volatilization of components of the material forming a low melting phase, the reactor being positioned ahead of the suspension sintering reactor 5. The fluidization reactor 30 is connected to the material discharge line 18 of the cyclone 17 of the calciner. A material line 31 extends from the fluidization reactor 30 into the lower end of the suspension sintering reactor 5. The fluidization reactor 30 is provided with a fuel supply line 32. The harmful components of the material volatilized in the fluidization reactor 30 are drawn off from the system by means of an exhaust gas line 33. Associated with this line 33 is a cooling device 34 by means of which the gases drawn off are cooled to such a degree that the harmful substances contained are recovered in crystalline form and can be removed from the dust by means of conventional dust-removal devices. Both the fluidization reactor 30 as well as the suspension sintering reactor 5 are connected to the cyclone separator 8 by means of recirculation lines 22 and 35. A material bypass 36 from the cyclone 17 of the calciner discharges into the material line 31.

Figure 6:
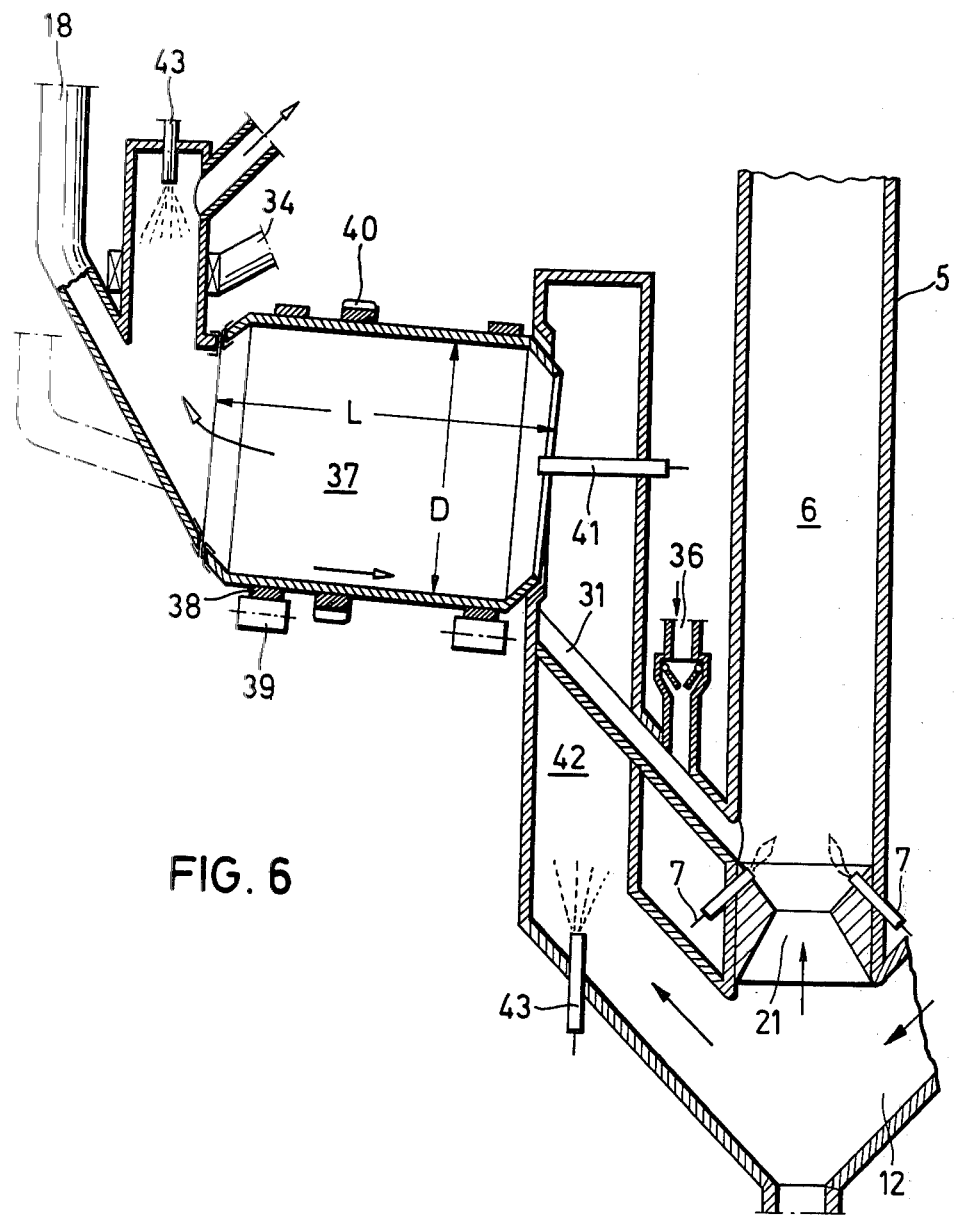
FIG. 6 illustrates a suspension type sintering reactor in combination with a relatively short rotary kiln.

Referring to FIG. 6, the heat treatment system shown there includes a short rotary kiln 37 for the vaporization of low melting materials instead of a fluidization reactor. The length to diameter ratio of the rotary kiln, expressed as L/D, is in the range of 2:1 to 4:1. The material discharge line 18 of the cyclone 17 of the calciner discharges into the intake end of the rotary kiln 37. The kiln is supported for rotation by means of bearing races 38 and pressure rollers 39 and is driven through a rim gear 40 from a drive (not shown). A burner 41 is arranged at the material discharge end of the rotary kiln 37. The discharge of the kiln is connected to the suspension sintering reactor by means of a housing 42 and by means of a material line 31. The latter is combined with a bypass line 36 to the material discharge line 18 of the cyclone 17 of the calciner. The housing 42 as well as the intake area of the rotary kiln 37 are provided with an inlet 43 for the introduction of water or water vapor to increase the volatility of the components forming the relatively low melting phases.

In operation, the cement raw material which ranges in size from fine-grain material to powder is delivered to the cyclone pre-heater 1 at the inlet line 2 and passes through the multi-stage cyclone pre-heater in counter-current flow to the hot gases passing through the pre-heater. The raw material may be a cement raw meal with low melting phase components such as alkalis, sulfur compounds, and the like. The pre-heated raw material is delivered to the material calciner 3 through an inlet 28 and is calcined in the hot combustion gases in the combustion segment 16 and is subsequently separated from the gas stream in the cyclone 17 of the calciner as shown in FIG. 2.

The highly calcined material is subsequently delivered to the fluidization reactor 30 for the volatilization of undesired compounds which may still remain. In the fluidization reactor 30, the material is again subjected to hot gases formed by combustion. The temperature of these hot gases is so high that the vaporization of the remaining undesirable components is ensured. The exhaust gases from the fluidization reactor 30 containing the volatilized components, for example alkalis or sulfur compounds, are quenched with cold air by means of the cooling device 34 so that the substances volatilized in the gases condense and can be supplied by means of the exhaust gas conduit 33 to a dust-removal system (not shown).

From the fluidization reactor 30, the material freed of the objectionable components is delivered by means of the material line 31 into the lower end of the combustion chamber 6 of the suspension sintering reactor 5, but above the cross-sectional constriction 21. Fuel and hot cooler exhaust gas are supplied to the combustion chamber to achieve temperatures of about 1400° to 1500° C., which temperatures are maintained in the suspension sintering reactor. At these temperatures, the cement raw material pretreated as described above is sintered in suspension. The dwell time in the combustion chamber of the reactor required for such sintering is achieved by providing a combustion chamber of the appropriate length. The length of the combustion chamber can be changed so as to be adapted to the material being treated by adding or subtracting individual elements 20. The sintered, fine-grain material is separated from the hot combustion gases in the material separator 8 connected to the combustion chamber 6. The sintered material, by means of the adjustment baffle 24, may be either partially reintroduced into the recirculation line 22 into the sintering reactor or directly conducted into the cyclone material cooler 9. In the material cooler, the material is cooled with cold air supplied by means of the blower 11 and is entirely or partially introduced without further grinding or other treatment directly into finished product storage areas.

The hot exhaust air of the material cooler is partially supplied as combustion air to the material calciner 3 and partially to the suspension sintering reactor. In the former case, it enters the sintering reactor at a location where the clinker mineral formation is already terminated. Preferably, this is at the end of the combustion chamber 6 before the hot combustion gases enter the separator cyclone 8. By this arrangement, cooling of the combustion gases is achieved so that the separator cyclone, particularly the dip pipe 26, is thermally protected. The combustion gases from the suspension sintering reactor enriched with oxygen are withdrawn from the material separator and supplied to the combustion segment 16 of the material calciner. With the aid of the hot exhaust gases in the material calciner, the material supplied to the pre-heater is heated to calcination temperatures upon passing through the individual cyclones of the pre-heater.

The improvements of the present invention are not limited to the embodiments illustrated and described, but rather extend to various modifications which lie within the framework of the claims of this application.

We claim as our invention:

1. In a method for heat treating a fine-grained material in which said material is sequentially passed through a pre-heating zone, a calcining zone, a sintering zone, and a cooling zone, the improvement which comprises separately heat treating the calcined material from said calcining zone to volatilize lower melting components, suspending the substantially calcined and heat treated material as an airborne suspension in said sintering zone and sintering the suspension in said sintering zone.

2. A method according to claim 1 which includes the step of separating the material from hot gases produced in said sintering zone in a separate separation zone between the sintering zone and the cooling zone.

3. A method according to claim 1 which comprises cooling the material leaving the sintering zone in the cooling zone in the form of an airborne suspension.

4. A method according to claim 1 which includes the step of dividing the fuel required for the heat treatment of the material between the calcining and sintering zones, introducing relatively low caloric fuel into the calcining zone and introducing relatively high caloric content fuel into the sintering zone.

5. A method according to claim 1 which includes the step of introducing hot air from the cooling zone selectively into the calcining zone or the sintering zone depending upon the nature of the fuel being burned in said zones.

6. A method according to claim 5 which includes the step of throttling the hot air being fed to said calcining zone to thereby distribute the same between said calcining zone and said sintering zone.

7. A method according to claim 5 which includes the steps of supplying the hot air withdrawn from the cooling zone to the sintering zone in relation to the gas velocity required in said sintering zone.

8. A method according to claim 5 which includes the step of supplying the hot exhaust gas from the cooling zone to the sintering zone at a location where the clinker mineral formation is substantially terminated.

9. A method according to claim 1 which includes the step of supplying exhaust gases from the sintering zone to the calcining zone.

10. A method according to claim 2 which includes the step of reintroducing a part of the material separated in the separation zone into the sintering zone.

11. A method according to claim 2 which includes the step of withdrawing a portion of the gas separated in the separation zone from the system in the area between the separation zone and the calcining zone.

12. A method according to claim 11 which includes the step of cooling the gases withdrawn from the system immediately after being withdrawn and subsequently removing dust from said gases.

13. A method according to claim 1 in which the lower melting components constitute less than 25% of the material delivered into the sintering zone.

14. A method according to claim 1 in which the lower melting components constitute from 10% to 20% of the material introduced into the sintering zone.

15. A method according to claim 1 which includes the step of introducing a flux material to the separate heat treatment to improve the volatility of the lower melting components.

* * * * *